United States Patent [19]
Taylor et al.

[11] Patent Number: 6,009,761
[45] Date of Patent: *Jan. 4, 2000

[54] MULTIPRODUCT FUEL DISPENSER USING ULTRASONIC METERING

[75] Inventors: Ken W. Taylor; David A. Biedermann, both of Austin, Tex.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/922,821

[22] Filed: Sep. 3, 1997

[51] Int. Cl.$^7$ ............................................. G01F 1/66
[52] U.S. Cl. ............................................ 73/861.27
[58] Field of Search .................. 222/144.5; 137/606, 137/266; 73/861.27, 861.28, 861.29, 861.31

[56] References Cited

U.S. PATENT DOCUMENTS

| | | | |
|---|---|---|---|
| 2,595,399 | 5/1952 | Marcou | 137/266 |
| 3,731,777 | 5/1973 | Burke et al. . | |
| 3,914,998 | 10/1975 | McShane | 73/861.28 |
| 3,935,735 | 2/1976 | Lee | 73/861.29 |
| 4,015,470 | 4/1977 | Morrison . | |
| 4,033,483 | 7/1977 | Neidorf | 137/266 |
| 4,150,767 | 4/1979 | Pitches et al. | 222/23 |
| 4,195,517 | 4/1980 | Kalinoski et al. . | |
| 4,320,659 | 3/1982 | Lynnworth et al. . | |
| 4,462,261 | 7/1984 | Keyes et al. . | |
| 4,646,575 | 3/1987 | O'Hair et al. . | |
| 4,748,857 | 6/1988 | Nakagawa . | |
| 4,978,029 | 12/1990 | Furrow et al. | 222/1 |
| 5,090,252 | 2/1992 | Tschirner . | |
| 5,105,666 | 4/1992 | Steinacher . | |
| 5,203,366 | 4/1993 | Czeck et al. | 137/3 |
| 5,214,966 | 6/1993 | Delsing . | |
| 5,257,720 | 11/1993 | Wulc et al. | 222/20 |
| 5,323,817 | 6/1994 | Spalding . | |
| 5,332,011 | 7/1994 | Spalding | 141/59 |
| 5,351,705 | 10/1994 | Reinders et al. | 137/606 |
| 5,630,528 | 5/1997 | Nanaji . | |

*Primary Examiner*—Benjamin R. Fuller
*Assistant Examiner*—Jewel V. Thompson
*Attorney, Agent, or Firm*—Haynes & Boone, L.L.P.

[57] ABSTRACT

A multiproduct fuel dispensing system for dispensing a plurality of fuels stored in a plurality of reservoir tanks. A single fuel delivery conduit delivers a specific grade of fuel from the reservoir tanks. An ultrasonic meter is in the conduit and uses sing-around measurement to measure flow through the meter. The meter has a volume of about 10 cubic centimeters and a flow rate of about 10 gallons per minute. The meter may stand alone in the conduit or may be integrally formed with an outlet casting in the conduit.

19 Claims, 1 Drawing Sheet

MULTIPRODUCT FUEL DISPENSER USING ULTRASONIC METERING

BACKGROUND

This invention relates to a multiproduct fuel dispenser and, more particularly, to such a dispenser that feeds more than one product through an ultrasonic metering device and a single hose and nozzle.

Many gasoline service stations require the installation of multiproduct fuel dispensers or pumps, each for dispensing a plurality of different grades, or octane levels, of gasoline products at each fueling station. Conventionally, three different products are provided per fueling station, namely a high octane fuel, a medium octane fuel and a low octane fuel. In the past, multiproduct dispensers had a separate hose for each product. Now, many such dispensers use the same hose and nozzle to dispense all products. Mixing of these various products can result in the dilution or lowering of the octane level of the high and medium octane fuels which can lower the octane level of the fuel delivered to the customer. Testing procedures have therefore been developed in the United States to certify the octane levels of the fuels dispensed from commercial fuel dispensers. The testing and certification procedures are set forth in the National Conference on Weights and Measures Publication No. 12, entitled "Examination Procedure Outlines for Weighing and Measuring Devices." Pursuant to these testing guidelines, the person conducting the the test sample. See page 57, line 1. Thus, in dispensers used at United States gasoline service stations, a slight mixing of the various fuel products of a multiproduct fuel dispenser may occur, so long as the contaminated product is flushed from the system during the first 0.3 gallons of discharge.

To avoid the mixing of the various products dispensed from a multiproduct fuel dispenser, known dispensers typically include a separate flow path for each product from its reservoir product tank which stores the fuel, to the outlet nozzle which introduces the fuel into the consumer's automobile. These systems therefore require the duplication of the components disposed between the tank and the nozzle for each fuel product, including the flow meter. In this manner, however, no contamination of the octane level of the products can occur. Through the use of such separate hoses, meters, etc., dispensers of the prior art avoid contamination of fuel being dispensed at a particular time, with fuel from a previous use that would otherwise remain in the system at the termination of the last dispensing cycle. Spalding, U.S. Pat. No. 5,332,011, a patent assigned to the assignee of the present invention, discloses such a dispenser, in which three nozzles, fuel hoses and flow meters, each for a different grade of gasoline, are combined in a single dispenser.

There are many disadvantages in the use of discrete delivery systems for each product fed through a multiproduct fuel dispenser. For example, the cost of such dispensers is increased due to the requirement for multiple hoses, nozzles and meters. Also, the overall size and space requirements of such a dispenser are increased due to the requirement to house the multiple components. In addition, and especially with respect to the flow meters, the cost of maintenance and repairs is increased for each discrete delivery system included in such dispensers.

In an effort to overcome some of the above problems, multiproduct fuel dispensers have been developed that comprise tri-axial fuel hoses having three concentric passages within a single hose that lead to a single nozzle. Such devices simplify operation for the consumer as there is only a single nozzle, but they do not alleviate the need for separate flow meters for each product or improve the maintenance and repair costs. Moreover, such devices might actually increase the cost of the dispenser due to the complexity of the tri-axial hoses.

Other multiproduct fuel dispensers have been developed in which the supply lines from each reservoir tank are manifolded into a single fuel hose downstream of the flow meter, which hose then leads to a single nozzle. Although this eliminates the cost of the multiplicity of nozzles and hoses, the problems associated with the multiplicity of flow meters, such as complexity, space limitations and repair and maintenance expenses, remain.

In one known device, different grades of fuel from three different storage sources can be delivered through a common meter and then dispensed through a dedicated hose and nozzle for each fuel grade. A specific valving arrangement controls the flow of a specific fuel grade through the meter and to the dedicated hose and nozzle. As an alternative, different grades of fuel from three different storage sources can be delivered through a common meter and then selectively dispensed through a single hose and nozzle. In this arrangement, valving selectively directs a specific fuel grade to the common meter and the meter is connected to the single hose and nozzle.

In another arrangement, fuel delivery of various grades through a single hose and nozzle is accomplished from two different grades of fuel (i.e., highest octane and lowest octane) stored separately. Here again, a specific valving arrangement controls the delivery of the selected fuel grade. The separately stored fuels may be blended to deliver one or more intermediate grades of fuel. This may be accomplished by proportional blending or fixed ratio blending. In proportional blending, various intermediate grades are a selectively blended mixture of some proportion of the high and low octane fuels. In fixed ratio blending, a single intermediate grade is produced including a fixed percentage of the high and low octane fuels.

In all blending dispensers there are two separate sets of hydraulics. One set is for controlling the low octane product input and another set is for controlling the high octane product input. In blending dispensers, whether of the proportional or fixed ratio type, the low and high octane hydraulic systems each contain a proportional flow control valve.

When any grade (low, high or blend) is selected, the blend ratio programmed into the dispensers computer determines the percentage or proportion of high product to be dispensed. When the low grade product is selected, the proportion or percentage of high product is 0%. When the high grade product is selected, the percentage of high product is 100%. When a blended grade is selected, a percentage of high product (less than 100%) is mixed with the remaining percentage of low product, and the combined total (100%) determines the octane rating of the blended grade.

Knowing the percentage or proportion of high, and thus low, product to dispense and by calculating the volume dispensed based on input signals from the pulsers, the computer signals the solenoid drive board which in turn controls the proportional flow control valves. Each proportional flow control valve continuously opens or closes, as directed by the solenoid drive board, to maintain the desired blend ratio and the maximum allowable flow rate.

A limitation with such arrangements is related to the 0.3 gallon limitation on multiproduct dispenser contamination.

Components of the dispenser system which contribute to the contamination include the meter, the line between the meter and an outlet casting, the hose and the nozzle. Therefore, it is important to limit the volume of each component in order to stay within the 0.3 gallon limitation.

The present meter is a mechanical positive displacement meter using technology which is over 50 years old. This meter includes over 100 parts, is cumbersome, not service friendly, and not easily interfaced with modern microprocessor based control systems. Although some electronic flow sensing devices have been recently introduced, present meters are of too large a volume, e.g., in excess of about 0.1 gallons, which is one-third of the permissible 0.3 gallons. Volume of these meters is large to produce the desired system flow rate of 10 gallons per minute (gpm). This means that the other components of the system which contribute to product contamination must be limited to no more than 0.2 gallons.

Therefore, what is needed is an economically feasible meter of smaller volume, i.e., substantially less than 0.1 gallons, able to operate at the system flow rate of 10 gpm, reliable due to few or no moving parts, and capable of almost infinite life.

SUMMARY

One embodiment, accordingly, provides a multiproduct fuel dispensing system which has improved flow metering capabilities and avoids unwanted product contamination problems associated with presently used metering devices. To this end, a multiproduct fuel dispensing system is provided for dispensing a plurality of fuels stored in a plurality of reservoir tanks. A single fuel delivery conduit delivers a specific grade of fuel from one or more of the reservoir tanks. An ultrasonic meter is connected to the conduit to measure flow through the meter.

A principle advantage of this embodiment is that the ultrasonic meter is of substantially small volume and is extremely reliable and capable of operating at a desired system flow rate. This embodiment improves previously known contamination problems while maintaining system efficiency and enhances system reliability and operational life.

DETAILED DESCRIPTION OF THE PREFERRED EMBODIMENT

Figure 1:
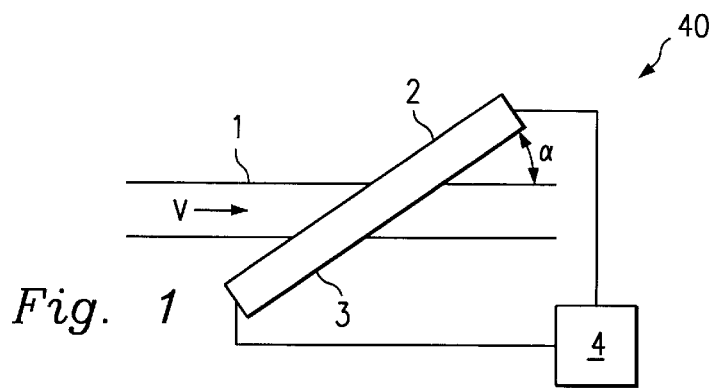
FIG. 1 is a schematic view illustrating an embodiment of an ultrasonic meter using the sing-around measurement technique.

FIG. 1 generally illustrates the principle of sing-around-type measurement. A fluid having the velocity v flows in a tube 1 from the left to the right through an ulrasonic flow meter 40. On each side of the tube 1, there is provided an ultrasonic transducer 2 and 3, respectively, which forms an angle a with the longitudinal axis of the tube 1. The transducers 2, 3 are interconnected by means of sing-around electronics, which are represented in the form of a box 4.

The velocity v of the fluid is measured in the tube 1. A sing-around loop is first established in the one direction by the sing-around electronics 4 exciting the transducer 2 to transmit an ultrasonic pulse, which is received by the transducer 3 after passing through the fluid in the tube 1. When detecting that the transducer 3 is receiving an ultrasonic pulse, the sing-around electronics 4 excite the transducer 2 to transmit a new ultrasonic pulse. The thus-established sing-around loop is maintained for a predetermined number of turns. Then, this procedure is repeated in the downstream direction.

The sing-around loop will oscillate with a certain period, which is referred to as the sing-around period and which depends on the sound velocity in the fluid between the transducers, the distance between the transducers, and the fluid velocity v. The sing-around period in the downstream direction is measured and the singaround period in the upstream direction is measured. If the distance between the transducers and the angle a between the respective transducers and the tube are known and if the sing-around periods are measured, the fluid velocity v can thus be calculated and may be used for determining e.g. the flow rate of mass in the tube 1. With the aid of the sing-around periods, the sound velocity in the fluid may be calculated.

In actual practice, the sing-around periods are determined by measuring the time it takes for the ultrasonic pulses to do the predetermined number of turns in the sing-around loops, and dividing it by that predetermined number. When calculating the fluid velocity and the sound velocity, a time correction for the delays in the electronics is made.

Figure 2:
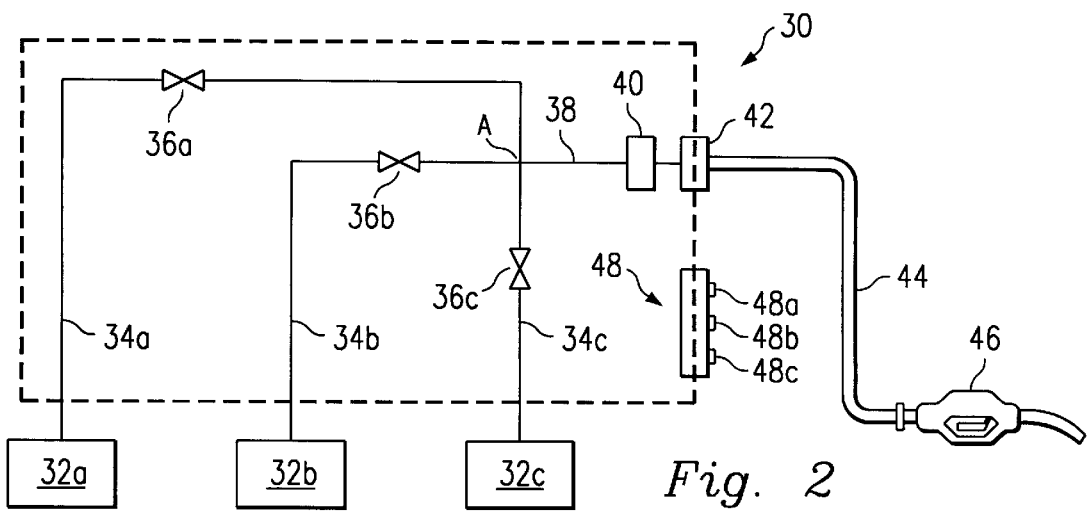
FIG. 2 is a schematic view illustrating an embodiment of a fuel dispensing system.

Referring now to FIG. 2, a multiproduct fuel dispenser of the present invention is shown schematically and generally referred to with reference numeral 30. The dispenser 30, like the prior art dispenser 10, receives fuel from a plurality of underground fuel reservoir tanks 32a–32c, each of which stores a different grade of fuel such as high, medium and low octane. Also like the prior art dispenser 10, separate fuel reservoir lines 34a–34c pass the fuel from the reservoir tanks 32a–32c into the dispenser 30 under the control of flow control valves 36a–36c, however, in the dispenser 30 of the present invention, the fuel reservoir lines 34a–34c converge into a single fuel delivery line 38 at a convergence point "A" upstream of the ultrasonic flow meter 40 of the sing-around type. The flow meter 40 is disposed in the fuel delivery line 38, which line passes the fuel out of the dispenser 30 via an outlet casting 42. A flexible fuel delivery condiut, or hose 44 extends from the outlet casting 42 and terminates in a nozzle 46 designed for insertion into a customer's automobile fuel tank (not shown). A product selection panel 48 having a plurality of buttons 48a–48c corresponding to the grades of fuel available through the dispenser 30 is mounted to the dispenser 30 and, together with the nozzle 46, controls the operation of the flow control valves 36a–36c in a conventional manner to allow the customer to select the desired grade of fuel from the reservoir tanks 32a–32c.

Like the flow meters 18a–18c of the prior art, the flow meter 40 generates an output signal in proportion to the gasoline flow through the meter to allow the customer to control the total amount of fuel dispensed; however, as opposed to flow meters of known multiproduct fuel dispensers, the fuel meter 40 of the present invention has a smaller internal volume such that no more than 0.1 gallons of fuel remains in the fuel meter 40 after use of the dispenser 30 as is further described below.

Figure 3:
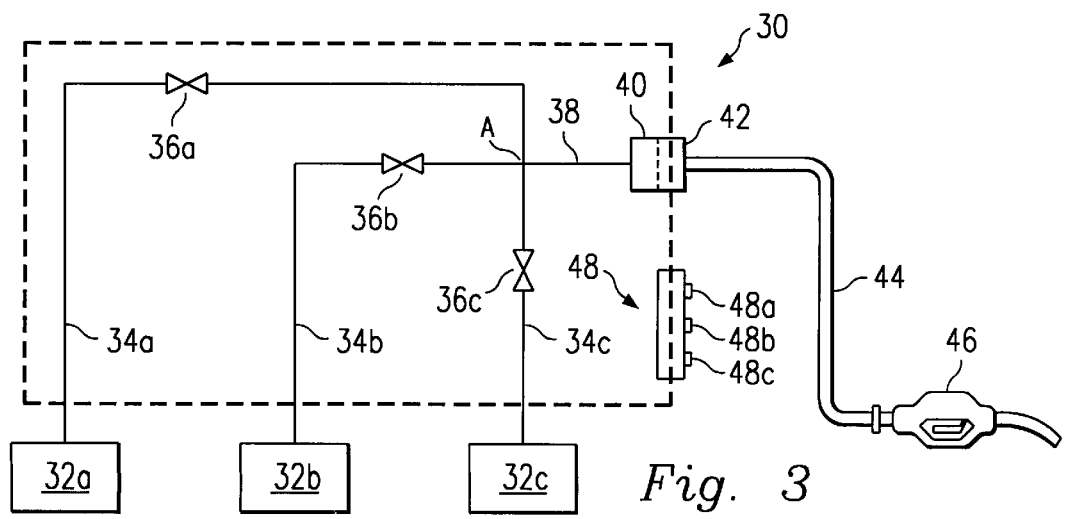
FIG. 3 is a schematic view illustrating an embodiment of another fuel dispensing system.

It should be understood that the dispenser 30 contains two fueling stations on opposing sides to service two customers at a time, each having a fuel delivery system as just described for dispensing fuel from the reservoir tanks 32a–32c. As such fueling stations are identical, only one station has been described. In addition, it should be emphasized that since FIG. 2 is merely a schematic representation of the basic components of the assembly of the present invention, the exact location, size and lengths of the components can vary within the scope of the invention. For example, the fuel meter 40 can be disposed in closer proximity to the outlet casting 42 to reduce the length of the fuel delivery line 38 in order to further reduce the amount of fuel remaining in the dispenser after use. Alternatively, in FIG. 3, meter 40 is provided as an integral part of or even a replacement for outlet casting 42.

The operation of the dispenser 30 of the present invention is similar to the operation of the prior art dispenser 10 in that the customer selects a desired grade of fuel from the product selection panel 48 by pressing the appropriate button 48a–48c. This selection is electronically transferred from the product selection panel 48 to the appropriate flow control valve 36a–36c in a conventional manner. Then, when the customer activates the nozzle 46, the appropriate flow control valve 36a–36c opens, thereby allowing fuel from the selected reservoir tank 32a–32c to travel through its associated fuel delivery line 34a–34c, through the convergence point "A" into the fuel reservoir line 38, and into the fuel meter 40. The fuel meter 40 tracks the amount of fuel flowing through the line, and thus the amount flowing into the customer's fuel tank via the hose 44 and the nozzle 46, to enable the dispenser 30 to calculate the cost of the dispensed fuel. When the customer's fuel tank is full, or any time that the customer desires to stop the fuel delivery by deactivating the nozzle 46, the activated flow control valve 36a–36c closes to stop the flow of fuel from the selected reservoir tank 32a–32c.

Upon the stoppage of fuel delivery, the selected fuel reservoir line 34a–34c and flow control valve 36a–36c, the fuel meter 40, the fuel delivery line 38, the hose 44 and the nozzle 46 all remain full of fuel. Unlike the dispenser 10, however, the fuel remaining in the dispenser 30 is equal to or less than 0.3 gallons of fuel due to the reduced internal volume of the single fuel meter 40. In this manner, even if the next customer selects a different grade of fuel, only a slight commingling of fuels will occur. Thus, the dispenser 30 can pass the United States National Conference on Weights and Measures testing and certification procedures for octane certification as the remaining fuel (0.3 gallons) will be flushed from the dispenser 30 before the test sample is collected.

The multiproduct fuel dispenser 30 of the present invention thus provides several benefits and technical advantages over prior art dispensers. Foremost, by employing a single common fuel meter 40, both the original costs, and the expected repair and maintenance costs, of the dispenser 30 are reduced due to the elimination of relatively expensive and high maintenance component parts, such as multiple fuel meters. Moreover, as parts have been eliminated, the overall size and space requirements of the dispenser 30 are reduced. Importantly, these benefits and advantages are achieved with a multiproduct fuel dispenser that still passes the United States octane certification procedures as no more than 0.3 gallons of fuel remain in the dispenser 30 that can be commingled with fuels of different octane levels.

Although illustrative embodiments have been shown and described, a wide range of modifications, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A multiproduct fuel dispensing system for dispensing a plurality of grades of fuel comprising:

a plurality of reservoir tanks;

a fuel dispenser;

each reservoir tank having a fuel reservoir line connected to deliver a specific grade of fuel from a specific one of the reservoir tanks to the fuel dispenser;

a single fuel delivery conduit connected at a first end to an intersection of each of the fuel reservoir lines, and connected at a second end sequentially to a single ultrasonic flow meter, an outlet casting and a delivery hose; and the single ultrasonic flow meter connected immediately adjacent to the outlet casting for measuring the amount of any of the grades of fuel flowing to the delivery hose.

2. The multiproduct fuel dispensing system as defined in claim 1 wherein the ultrasonic flow meter has a volume of about 10 cubic centimeters.

3. The multiproduct fuel dispensing system as defined in claim 2 wherein the ultrasonic flow meter operates at a system flow rate of about 10 gallons per minute.

4. The multiproduct fuel dispensing system as defined in claim 1 wherein the system includes the ultrasonic flow meter and the outlet casting mounted in a common housing.

5. The multiproduct fuel dispensing system as defined in claim 1 wherein the ultrasonic flow meter includes sing-around measurement.

6. A multiproduct fuel dispensing system for dispensing a plurality of grades of fuel comprising:

a plurality of reservoir tanks;

a fuel dispenser;

each reservoir tank having a fuel reservoir line connected to deliver a specific grade of fuel from a specific one of the reservoir tanks to the fuel dispenser;

a single fuel delivery conduit connected at a first end to an intersection of each of the fuel reservoir lines, and connected at a second end sequentially to a single ultrasonic flow meter, an outlet casting and a delivery hose;

a flow control valve in each of the fuel reservoir lines for controlling the flow of fuel therethrough;

a product selector connected to control each of the flow control valves for selecting a specific grade of fuel from one of the reservoir tanks;

a nozzle connected to the delivery hose to actuate the flow control valves to deliver a specific grade of fuel; and the single ultrasonic flow meter connected immediately adjacent the outlet casting for measuring any of the grades of fuel flowing to the delivery hose.

7. The system as defined in claim 6 wherein the dispenser includes the ultrasonic flow meter mounted in the outlet casting.

8. The system as defined in claim 6 wherein the ultrasonic flow meter has a volume of about 10 cubic centimeters.

9. The system as defined in claim 6 wherein the ultrasonic flow meter operates at a system flow rate of about 10 gallons per minute.

10. The system as defined in claim 8 wherein the dispenser includes the ultrasonic flow meter mounted in a single housing with the outlet casting.

11. The system as defined in claim 6 wherein the ultrasonic flow meter includes sing-around measurement.

12. A multiproduct fuel dispensing system for dispensing a plurality of grades of fuel comprising:

a plurality of reservoir tanks;

a fuel dispenser;

a dedicated reservoir fuel line connected to each reservoir tank and to a first end of a single fuel delivery conduit, the single fuel delivery conduit having a second end connected in sequence to a single ultrasonic flow meter, an outlet casting and a delivery hose; and the single ultrasonic flow meter connected immediately adjacent the outlet casting for measuring any of the grades of fuel flowing to the delivery hose.

13. The system as defined in claim 12 wherein the ultrasonic flow meter includes sing-around measurement.

14. The system as defined in claim 13 wherein the flow meter and the outlet casting are mounted in a common housing.

15. The system as defined in claim 13 wherein the ultrasonic flow meter has a volume of about 10 cubic centimeters.

16. The system as defined in claim 15 wherein the ultrasonic flow meter operates at a system flow rate of about 10 gallons per minute.

17. The system as defined in claim 15 wherein each dedicated fuel line includes a flow control valve.

18. The system as defined in claim 13 further comprising a selector connected for selecting a product from any of the reservoir tanks to be delivered through the delivery hose.

19. A system for dispensing a plurality of fuels stored in a plurality of sources, respectively, the system comprising a conduit extending from each source, a valve associated with each conduit for controlling the flow of fluid through the conduit, a single fuel delivery line connected to a convergence of all of the conduits for receiving fluid from one or more of the conduits, a control device for selectively controlling each valve so that fluid flows from a selected one of the sources, through its corresponding conduit and to the single fuel delivery line, and sequentially to an ultrasonic flow meter, an outlet casting, a single fuel delivery hose, and a dispensing nozzle, the flow meter including a pair of transducers for transmitting ultrasonic pulses through the fluid in the meter and for receiving the pulses to enable the velocity of the fluid passing through the meter, and therefore the amount of dispensed fluid through the nozzle, to be determined.

* * * * *